United States Patent [19]

Miller, Jr.

[11] Patent Number: 4,941,267
[45] Date of Patent: Jul. 17, 1990

[54] ELECTRONIC MEASURING DEVICE AND METHOD FOR OBTAINING AN ACTUAL MEASUREMENT BETWEEN POINTS SHOWN ON A SCALED DRAWING

[76] Inventor: Ronald J. Miller, Jr., 3461 Swigart Rd., Bellbrook, Ohio 45305

[21] Appl. No.: 387,586

[22] Filed: Jul. 31, 1989

[51] Int. Cl.⁵ .............................................. B43L 5/00
[52] U.S. Cl. ..................................... 33/700; 33/706; 33/784; 377/24
[58] Field of Search ............... 33/784, 1 M, 700, 706; 377/24

[56] References Cited

U.S. PATENT DOCUMENTS

| | | | |
|---|---|---|---|
| 2,296,104 | 9/1942 | Handley | 33/700 |
| 2,875,524 | 3/1959 | Bower et al. | 33/708 |
| 3,973,326 | 8/1976 | Gallacher et al. | |
| 4,095,273 | 6/1978 | Gonzalez | 33/700 |
| 4,158,229 | 6/1979 | Woo, Jr. et al. | |
| 4,216,584 | 8/1980 | Meissner et al. | |
| 4,221,056 | 9/1980 | Koenuma | |
| 4,239,957 | 12/1980 | Satoh et al. | 377/24 |
| 4,257,107 | 3/1981 | Heymsfield et al. | |
| 4,282,571 | 8/1981 | Giovannoli et al. | |
| 4,435,904 | 3/1984 | Logan et al. | |
| 4,468,860 | 9/1984 | Rodengen | |
| 4,839,833 | 6/1989 | Parhiskari | 33/494 |

FOREIGN PATENT DOCUMENTS

| | | | |
|---|---|---|---|
| 1120413 | 7/1968 | United Kingdom | 33/706 |
| 1183604 | 3/1970 | United Kingdom | 33/706 |
| 2137002 | 9/1984 | United Kingdom | 33/706 |

*Primary Examiner*—Thomas B. Will
*Attorney, Agent, or Firm*—Jacox & Meckstroth

[57] ABSTRACT

A method and apparatus for obtaining an actual measurement in feet and inches of the distance between two points which appear on a scaled drawing by adjusting a first and second indicator to locate on the drawing a first and second point, and generating a voltage signal corresponding to the distance between the two points. A converter then converts the voltage signal to a frequency signal which is received by a first counter which generates a first binary count in response thereto. Logic gates couple the first counter to a second counter which generates a second binary count which is incremented by the first counter when the first counter reaches twelve. The first and second binary counts represent the feet and inches, respectively, portion of the measurement, and the actual measurement in feet and inches is displayed on liquid crystal displays mounted in the housing of the apparatus.

31 Claims, 3 Drawing Sheets

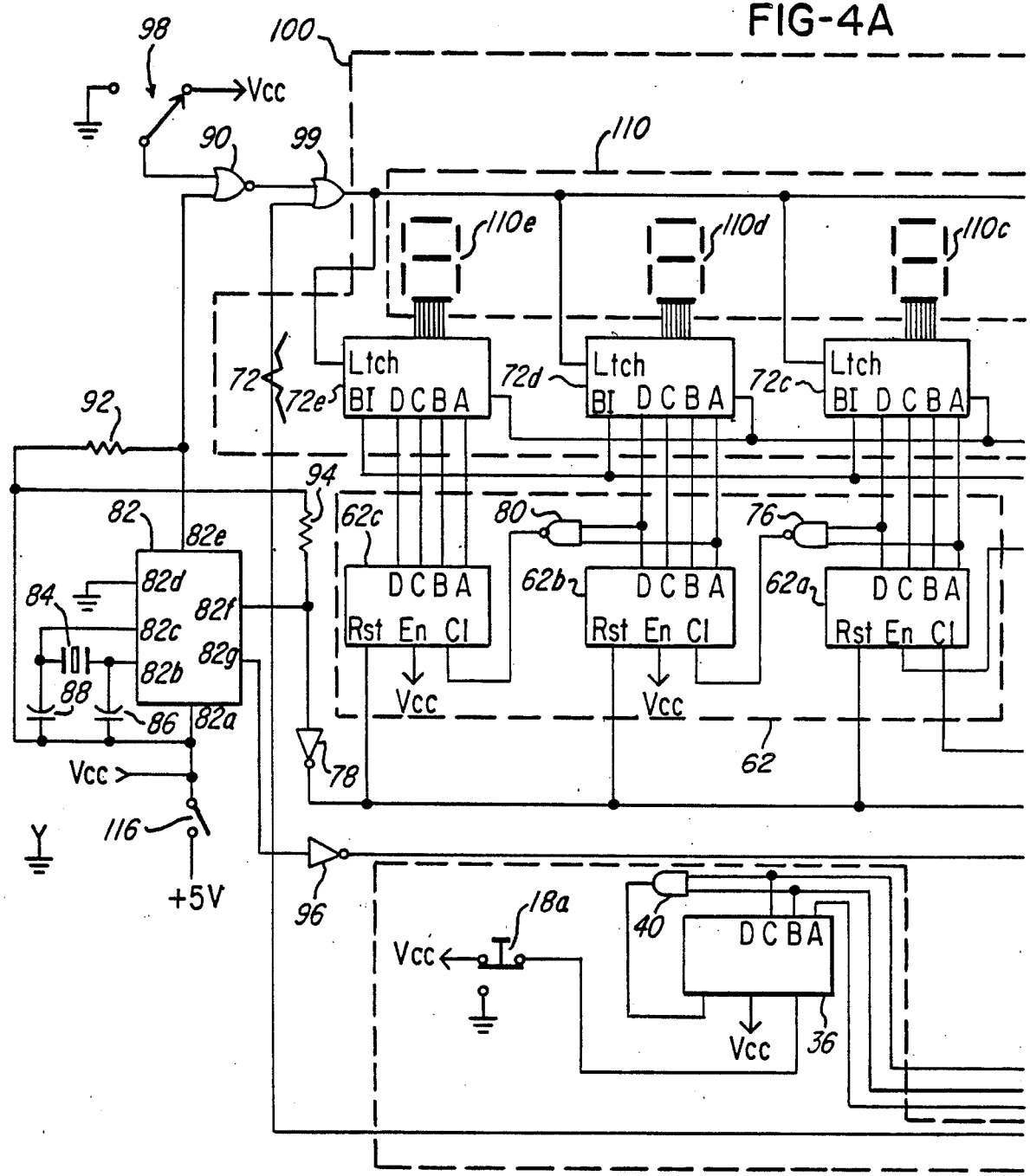

ELECTRONIC MEASURING DEVICE AND METHOD FOR OBTAINING AN ACTUAL MEASUREMENT BETWEEN POINTS SHOWN ON A SCALED DRAWING

BACKGROUND OF THE INVENTION

1. Field of the Invention

This invention relates to an electronic measuring device, and more particularly, to an electronic measuring device for obtaining the actual measurement of the distance between a first point and a second point which are shown on a scaled drawing and for displaying the measurement in feet and inches.

2. Description of Related Art.

In various professions, such as engineering, construction and architecture, it is sometimes necessary to make feet and inch measurements directly from a scale drawing or blueprint. For example, a construction engineer, who is responsible for placing electrical conduits in a building, may need to know exactly how far from a particular wall a conduit should be placed. The construction engineer would refer to a scaled drawing or blueprint of the building and would try to use an engineer's scale to make these measurements. The measurements may require an excessive amount of time and may often be inaccurate, because of the engineer's scale is confusing and difficult to use.

Electronic measuring devices for making measurements that would customarily be performed manually with an engineer's ruler are known in the prior art. U.S. Pat. Nos. 4,435,904, 4,282,571 are examples of two such prior art devices. Another U.S. Pat. No. 4,216,584 illustrates an electronic distance measuring device which has circuitry which includes an analog to digital integrated circuit.

The prior art electronic measuring devices, however, include circuitry which demands relatively large power requirements, and which displays the measurements digitally, for example, in feet and tenths of feet on a low resolution screen. For example, U.S. Pat. No. 4,435,904 uses a microprocessor in order to mathematically generate a displayed measurement.

SUMMARY OF THE INVENTION

This invention overcomes the problems of the prior art by providing an electronic measuring device that is designed to provide a high resolution, low power consuming, and inexpensive device for making actual measurements in feet and inches of the distance between two points on a drawing or blueprint.

An object of this invention is to provide an electronic measuring device for determining the actual distance in feet and inches between a first point and a second point on a scaled drawing, the electronic measuring device comprising: a master controller for controlling the electronic measuring device, the master controller being capable of generating a reset signal, calibrating means for adjustably selecting a scale of measurement, indicia means coupled to the calibrating means for indicating the location of the first and second points on the scaled drawing, generating means coupled to the calibrating means for generating a first signal corresponding to the actual measurement corresponding to the distance between the first and second points as located by the indicia means, converting means coupled to the generating means for converting the first signal to a second signal, first binary counter means coupled to the converting means for receiving the second signal and for generating a first binary count in response thereto, second binary counter means for generating a second binary count, first logic gate means operatively coupling the first binary counter means and the second binary counter means and the converting means and the master controller, whereby the second binary count is incremented when the first binary count reaches a predetermined count, and output means coupled to the first and second binary counter means for receiving the first and second binary counts and also for outputting the actual measurement which corresponds thereto, the output means including latch means operatively coupling the master controller and the output means, and the first and second counter means for latching the first and second binary count until the latch means receives the reset signal from the master controller.

Another object of this invention is to provide a method for obtaining an actual measurement in feet and inches of the distance between a first and second point on a scale drawing, the method comprising the steps of (a) locating the first and second points, (b) generating a voltage signal corresponding to the actual measurement of the distance between the first and second points, (c) converting the voltage signal generated in step (b) to a frequency signal, (d) generating a first binary count in response to the frequency signal, (e) incrementing a second binary count when the first binary count reaches a predetermined count, and (f) outputting the first and second binary counts.

Some advantages of this invention are that it is easy and inexpensive to manufacture.

These advantages, and others, may be more readily understood in connection with the following specification, claims, and drawing.

BRIEF DESCRIPTION OF THE DRAWING

FIGS. 4, 4A and 4B are a circuit diagram of the circuitry used in the preferred embodiment of the present invention.

DESCRIPTION OF THE PREFERRED EMBODIMENT

Figure 1:
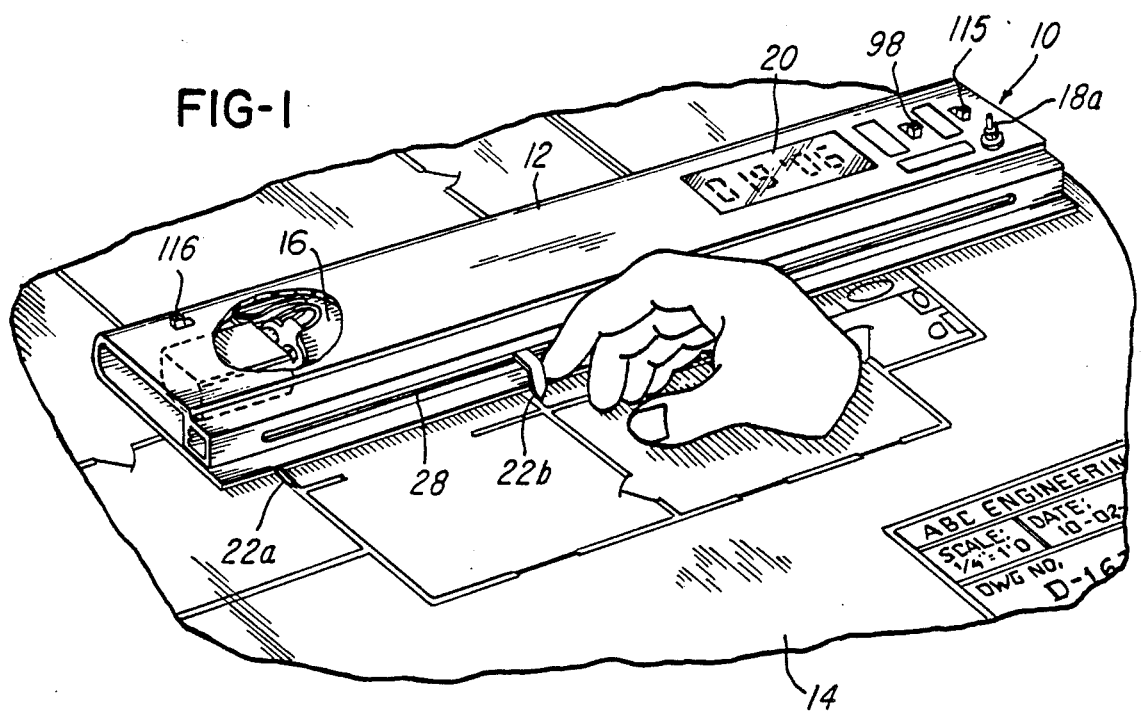
FIG. 1 is a perspective view of a preferred embodiment of the invention.

FIG. 1 shows a perspective view of a preferred embodiment of the present invention, hereinafter designated generally as measuring device 10. Measuring device 10 includes a housing 12 having a flat bottom surface (not shown) which is placed on a drawing 14, such as a blue print, graph, map, chart, and the like The measuring device 10 permits an actual measurement of the distance between a first and second point on the drawing 14 to be taken and displayed in feet and inches. In the preferred embodiment, the measuring device 10 is portable and the housing 12 is molded from plastic materials, but it could be made of any suitable material that is capable of providing an enclosure for the measuring device. The housing 12 includes a power source or storage means 16 for energization and/or for storing a source of potential for energizing the measuring device 10 directly in the housing 12. In a preferred embodiment, a five volt battery resides in the housing 12, as best shown in FIG. 1. The measuring device 10 has a calibrating means 18 (FIG. 4) having a switch 18a for calibrating or adjusting the measuring device 10 to a preselected scale of measurement. For example, if a ¼ inch to one foot scale of measurement is desired, the switch 18a is actuated to the ¼ scale location. The switch 18a can be any suitable push button or rotary switch. As described later herein, the electronic measuring device 10 can display the scale of measurement selected on an output means 20.

Figure 2:
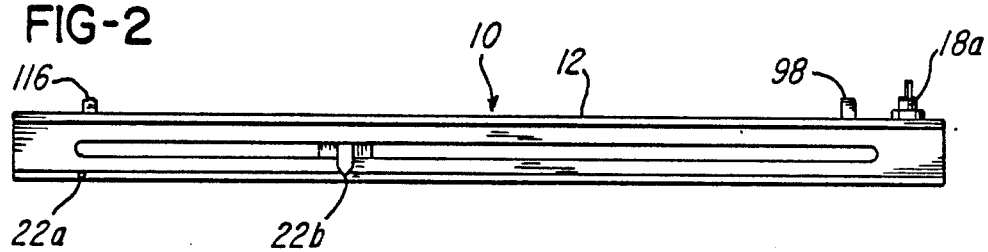
FIG. 2 is a front view of a preferred embodiment of this invention.
Figure 3:
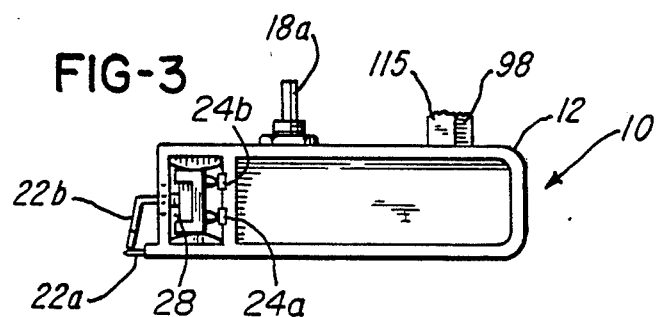
FIGS. 3 is a right side view of a preferred embodiment of this invention.
Figure 4B:
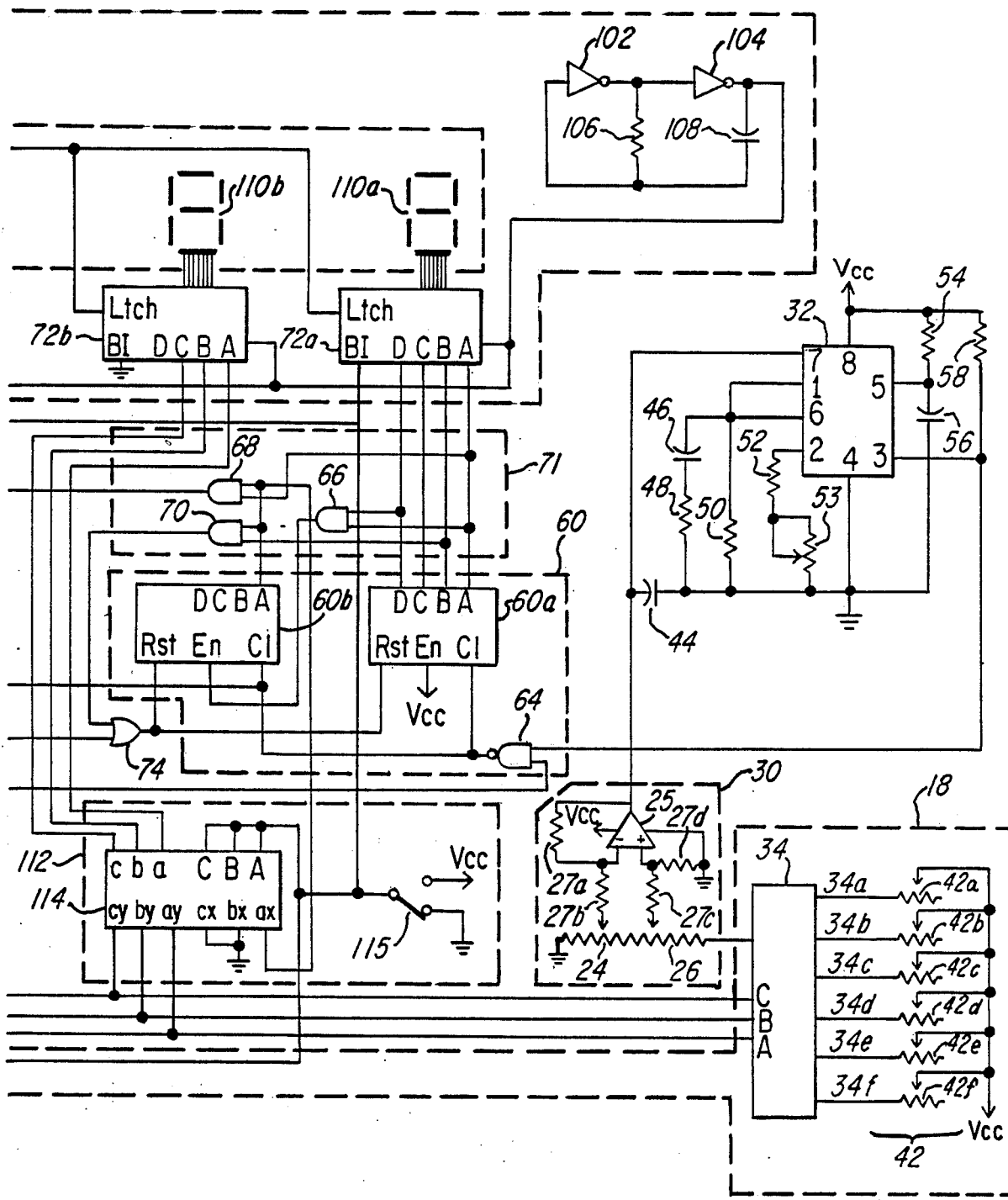

The housing 12 has associated therewith an indicia means 22 (FIGS. 1 and 2) for indicating the location of a first and second point on the drawing 14. The indicia means 22 includes a first and second indicator 22a and 22b, respectively, which are slidably adjusted to locate the position of said first and second points, respectively, on the drawing 14. The first and second indicators 22a and 22b are mounted on the arms 24 (FIG. 3). The arms 24 includes conductive arm 24a and resistance arm 24b to provide a potentiometer 26, as best shown in FIG. 4b. The operation of the potentiometer 26 will be described later herein. It is to be noted that the first and second indicators 22a and 22b are received in a rectangular tubular opening or elongated opening 28 (FIG. 3) in the housing 12. As shown in FIG. 1, the indicators 22a and 22b are pointed and extend away from the housing to make it easy to locate the first and second points on the drawing 14. The first and second indicators 22a and 22b and the conductive arm 24a are made from any suitable conductive material, and the resistance arm 24b is made of any suitable resistance material.

FIG. 4 illustrates circuitry which is suitable for use in this measuring device 10 in accordance with the present invention and which can be enclosed within housing 12. As previously mentioned, the measuring device 10 includes a calibrating means 18 for adjusting the measuring device 10 to a preselected scale of measurement. The calibrating means 18 includes a normally closed switch 18a which operatively couples a binary counter 36 to an adequate source of potential. The calibrating means 18 also includes a multiplexer 34 which is operatively coupled as shown to an AND gate 40 and the binary counter 36. The inputs 34a through 34f of the multiplexer 34 are coupled to a scale set potentiometer 42, with the taps of the scale set potentiometer 42 being connected to the source of potential. The switch 18a is operatively coupled to the scale set potentiometer 42 to enable a scale of measurement to be selected. The measuring device 10 further includes a generating means 30 for generating a voltage signal corresponding to the actual measurement of the distance on the drawing 14. The generating means 30 includes the potentiometer 26, comprised of the arms 24 and indicia means 22 mentioned above. The potentiometer 26 has one terminal coupled to ground and a second terminal connected to the output of the multiplexer 34 as shown When the first and second indicators 22a and 22b are positioned on the arms 24 to indicate the location of the first and second points, respectively, the generating means 30 generates a voltage signal corresponding thereto. The voltage signal generated by the generating means 30 corresponds to a scaled representation in feet and inches of the distance between the first and second points because the potentiometer 26 is coupled to the calibrating means 18. An operational amplifier 25 is operatively coupled to resistors 27a, 27b, 27c, 27d, to the source of potential, and to ground as shown in FIG. 4.

An output terminal of operational amplifier 25 is coupled to a pin 7 of the voltage to frequency converter 32. The function of the voltage to frequency converter 32 is to convert the voltage signal generated by the generating means 30 to a corresponding frequency signal. It is to be noted that the output terminal of operational amplifier 25 is also connected to a terminal of a capacitor 44. The other terminal of the capacitor 44 is connected to ground. A pin 1 of converter 32 is connected to a pin 6, to one terminal of capacitor 46, and to a first end of a resistor 50. The other terminal of the capacitor 46 is coupled to a first end of a resistor 48 which has a second end coupled to ground. The second end of the resistor 50 and the pin 4 of the converter 32 are also coupled to ground. Pin 2 of converter 32 is connected to a first end of a resistor 52, and a second end of the resistor 52 is connected to the tap and to the one terminal of a potentiometer 53. The remaining terminal of the potentiometer 53 is connected to ground. Pin 8 of converter 32 and resistor 54 are connected to the source of potential. The second end of the resistor 54 is connected to pin 5 of the converter 32 and to a capacitor 56. The other terminal of the capacitor 56 is connected to ground. A resistor 58 has a first end connected to the source of potential and a second end connected to pin 3 of the converter 32 and also to a NAND gate 64, as described later herein.

A first binary counter means 60 includes binary counters 60a and 60b which are operatively coupled as shown. The second binary counter means 62 includes binary counters 62a, 62b, and 62c. In the preferred embodiment, the binary counters 60a and 60b are conventional base 10 (0 to 9) counters, such as model 4518 manufactured by National Semiconductor Corporation. The output of the NAND gate 64 is connected to the clock inputs of binary counters 60a, 60b, and 62a. The NAND gate 64 has an input terminal connected to the second end of the resistor 58 and another input terminal connected to an inverter 96 as described later herein. The A output of binary counter 60a is connected to a terminal of an AND gate 66 and the AND gate 68 as shown. The B output of the binary counter 60a is connected to a terminal of an AND gate 70. The D output of binary counter 60a is connected to the other terminal of the AND gate 66. The enable terminal of binary counter 60a is connected to the source of potential, and the reset terminal of binary counter 60a is connected to the reset terminal of the binary counter 60b and to the output terminal of an OR gate 74.

The enable terminal of binary counter 60b is connected to the output of the AND gate 66. The A output of binary counter 60b is connected to the terminal of AND gate 68 and to the AND gate 70 as shown. The output of the AND gate 70 is connected to a first terminal of the OR gate 74.

The enable terminal of binary counter 62a is connected to the output terminal of the AND gate 68. The A output of binary counter 62a is connected to a terminal of a NAND gate 76. The D output of the binary counter 62a is connected to the other terminal of the NAND gate 76. The reset terminal of the binary counter 62a is connected to the output of an inverter 78 and to the second terminal of the OR gate 74 as shown.

The clock input of binary counter 62b is connected to the output of NAND gate 76. The enable terminal of binary counter 62b is connected to the source of potential, and the reset terminal is connected to the output of an inverter 78 and to the second terminal of an OR gate 74. Notice that the A terminal of binary counter 62b is connected to a terminal of a NAND gate 80, and the D terminal is connected to a the other terminal of the NAND gate 80.

The enable terminal of the binary counter 62c is connected to the source of potential, and the clock input is connected to the output terminal of the NAND gate 80. The reset terminal of the binary counter 62c is connected to the output of the inverter 78. The output of the inverter 78 is connected to the second terminal of the OR gate 74.

It is to be noted that the A, B, C, and D terminals of the binary counters 60a, 60b, 62a, 62b, and 62c are connected to the A, B, C, and D terminals, respectively, of latches 72a, 72b, 72c, 72d, and 72e of a latch means 72 for latching the output of the binary counters as will be described later herein.

The circuit in the measuring device 10 also includes a master controller 82 for controlling the timing of the circuit. A suitable master controller 82 is the ICM 7207 manufactured by Intersil, Inc. Terminal 82a of the master controller 82 is connected to the source of potential and to a normally open main power switch 116 which, when actuated, also connects the terminal 82a to any suitable source of potential, such as 5 volts. Terminal 82b is connected to a first end of a crystal 84 and one end of a capacitor 86. The second end of the crystal 84 is connected to the terminal 82c and one end of a capacitor 88. The other ends of the capacitors 86 and 88 are both connected to the source of potential as shown. The terminal 82d of the master controller 82 is connected to ground. Terminal 82e of the master controller 82 is connected to a first terminal of a NOR gate 90 and to one end of a pull up resistor 92. The other end of the resistor 92 is connected to the source of potential. Terminal 82f of the master controller 82 is connected to the connected to the input of the inverter 78 and to one end of pull up resistor 94. The other end of resistor 94 is connected to the source of potential. A terminal 82g of the master controller 82 is connected to the input of an inverter 96. The output of the inverter 96 is connected to the terminal of the NAND gate 64.

A data hold switch 98 is coupled to the second input terminal of the NOR gate 90. The switch 98 operatively couples the NOR gate 90 to the source of potential depending or to ground depending on which position the data hold switch 98 is in. The output terminal of the NOR gate 90 is connected an input terminal of OR gate 99. The other input terminal of the OR gate 99 is connected to the A, B, and C outputs of multiplexer 114 as shown. The output terminal of the OR gate 99 is connected to the latch terminal of latches 72a, 72b, 72c, 72d, and 72e of the latch means 72.

The measuring device also includes an output means 100 for outputting the actual measurement of the distance between the first and second points on the drawing 14. The output means 100 includes an inverter 102 which has its output connected to the input of an inverter 104 and to one end of a resistor 106. The other end of the resistor 106 is connected to the input of inverter 102 and to one end of a capacitor 108. The other end of the capacitor 108 is connected to the output of the inverter 104. The output of the inverter 104 is connected to the backplane inputs of latches 72a, 72b, 72c, 72d, and 72e of the latch means 72. The output means 100 includes a plurality of liquid crystal displays, hereinafter designated as a LCD 110. The latches 72a, 72b, 72c, 72d, and 72e of latch means 72 each have seven segment outputs connected as shown to 110a, 110b, 110c, 110d, and 110e, respectively, of the LCD 110.

In the preferred embodiment, the measuring device 10 includes a display means 112 for displaying on the LCD 110 the preselected scale of measurement selected with the calibrating means 18. The function of the display means 112 is to display the scale of measurement selected when the measuring device 10 is calibrated. As shown in FIG. 4, the display means includes a multiplexer 114 having a bx and cx input terminals which are connected to ground. The A, B, and C inputs of multiplexer 114 and to the blanking inputs of the LCD 110a, 110b, 110c, 110d and 110e of the LCD 110 are coupled to display switch 115. The a, b, and c outputs of multiplexer 114 are connected to the A, B, and C inputs, respectively, of latch 72b. The display switch 115 connects the multiplexer 114 to the source of potential or to ground.

As mentioned previously, the measuring device 10 includes a calibrating means 18 which has the binary counter 36. The clock terminal of the binary counter 36 is connected to a terminal of the scale select switch 18a, and the enable terminal of binary counter 36 is connected to the source of potential. The output terminal B of the binary counter 36 is connected to an input terminal of the AND gate 40, and output terminal C is connected to the other input terminal of the AND gate 40. The output terminal of the AND gate 40 is connected to the reset input of the binary counter 36. The A, B, and C terminals of the binary counter 36 are connected to the ay, by, and cy terminals, respectively, of a multiplexer 114. The A, B, and C terminals of the binary counter 36 are also connected to the A, B, and C, respectively, input terminals of the multiplexer 34. Input terminals 34a, 34b, 34c, 34d, 34e, and 34f of the multiplexer 34 are coupled to an end of resistors 42a, 42b, 42c, 42d, 42e, and 42f, respectively. The second end of resistors 42a through 42f are coupled to the source of potential.

The method of operation and use of the measuring device 10 will now be discussed. In order to make an actual measurement of the distance between a first and second point on the scaled drawing 14, any suitable voltage, such as 5 volts, may be applied to a switch 116 (FIG. 4) to energize the circuit when the switch 116 is closed. The switch 115 is actuated to display the scale of measurement selected. Once the measuring device 10 is energized, an actual scale of measurement is selected with the calibrating means 18 by actuating the scale select switch 18a. For example, if a ¼ inch scale of measurement is desired, the scale select switch 18a is actuated until the calibrating means 18 is set on ¼ inch.

The first and second indicators 22a and 22b of the indicia means 22 are slidably adjusted along the arms 24 until the desired first and second points are located on the drawing 14. The potentiometer 26 generates a voltage signal corresponding to the actual measurement of the distance between the first and second points on the drawing. The multiplexer 34 increases the resistance of the potentiometer 34 by switching to resistor 42a, 42b, 42c, 42d, 42e, or 42f, depending on the scale of measurement selected. The potentiometer 26 generates a voltage signal corresponding to the actual measurement of the distance between the first and second points on the drawing 14. The voltage to frequency converter 32 converts the voltage signal to a proportional frequency signal. The frequency signal is outputted through pin 3 of the voltage to frequency converter 32 and inputted to the first binary counter means 60 which generates a first binary count corresponding to the frequency signal.

Before the frequency signal can arrive at the inputs of the binary counters 60a, 60b, and 62a, all the binary counters are reset to zero by the reset signal generated by the master controller 82. The frequency signal passes through the NAND gate 64 to the clock inputs of the binary counters 60a, 60b, and 62a when the master controller 82 outputs the proper signal through the inverter 96 which also passes through the NAND gate 64. The binary counters, 60a and 60b, generate a first binary count corresponding to the frequency signal in the following manner. The output terminals A, B, C, and D of the binary counter 60a have a zero voltage level which results in a zero voltage level at the terminals of the AND gate 66. The output terminal of the AND gate 66 is connected to the enable input of the binary counter 60b, and consequently, the binary counter 60b will not be enabled in order to receive the frequency signal from the voltage to frequency converter 32 until the tenth pulse of the frequency signal. The binary counter 60a counts the pulses of the frequency signal until it gets to a count of nine (binary 1001) whereupon the D, C, B, and A output terminals of the binary counter 60a becomes binary 1, 0, 0, and 1, respectively. Thus, the A and D output counts are binary 1 and are inputted to the AND gate 66 which outputs a binary 1 and enables the binary counter 60b to count the next frequency pulse.

On the tenth pulse of the frequency signal, the binary counter 60a resets to zero. The output terminals D, C, B, and A terminal of the binary counter 60a also reset to zero, and the binary counter 60b then counts to binary 0001. On the twelfth pulse of the frequency signal, both inputs of AND gate 70 become binary 1 because the D, C, B, and A output terminals of binary counters 60a and 60b will have a count of 0010 and 0001, respectively. Thus, on the twelfth pulse the output of both the AND gate 70 and the OR gate 74 will be binary 1. The output of the OR gate 64 causes the binary counters 60a and 60b to be reset to zero. Thus, binary counters 60a and 60b generate a first binary count in base twelve which corresponds to the inches portion of an actual measurement between points on a scaled drawing. Although a predetermined count of twelve was selected so as to generate a binary count corresponding to inches which are in base twelve, it is to be noted that the invention can be modified so as to generate a binary count when the first binary counter means 62 reaches a predetermined count of, for example, base ten.

The first binary counter means 60 is coupled to the second binary counter means 62 by the logic gate means 71. It is to be noted that a binary 1 is outputted by the AND gate 68 on the eleventh pulse which enables the binary counter 62a to count the next frequency pulse. When the counter 62a counts to binary 1001, the output of the NAND gate 76 goes to binary 0. On the next pulse of the frequency signal counted by the binary counter 62a, the output of the NAND gate 76 goes back to binary 1, thereby incrementing the binary counter 62b. The binary counter 62b increments the binary counter 62c in the same manner. The binary counters 62a, 62b, and 62c of the second binary counter means 62 generate a second binary count which corresponds to the feet portion of the actual measurement. The combination of the second binary count with the first binary count is an output of the actual measurement in feet and inches.

The output means 100 is coupled to the first and second binary counter means 60 and 62, respectively, for receiving the first and second binary counts and for outputting the actual measurement corresponding thereto. The binary counters 60a, 60b, 62a, 62b, and 62c are connected to the latches 72a, 72b, 72c, 72d, and 72e, respectively. The latches 72a, 72b, 72c, 72d, and 72e receive and latch the first and second binary counts and convert them into a form suitable for inputting into the LCD 110a, 110b, 110c, 110d, and 110e, respectively. The inverters 102 and 104, connected as described above, generate a stream of square waves suitable for use by the LCD 110.

The output means 100 can be used to display the preselected scale of measurement by actuating the display switch 115 which causes the multiplexer 114 to receive A, B, and C outputs of binary counter 36. The multiplexer 114 causes the c, b, and a outputs of the multiplexer 114 to be inputted to the C, B, and A inputs, respectively, of the latch 72b, thereby causing the preselected scale to be display on LCD 110b.

The master controller 82 has a predetermined gating period established by the frequency of the crystal 84 which is selected to allow the binary counters 60a, 60b, 62a, 62b, and 62c to count for a predetermined period of time. After the predetermined period of time the master controller 82 causes the latch means 72 to latch the first and second binary counts generated by the first and second binary counter means 60 and 62, respectively. After the first and second binary counts are latched, the master controller generates a reset signal which resets binary counters 60a, 60b, 62a, 62b, and 62c to zero. The other components coupled to the master controller 82 are necessary to generate the reset signal discussed above. The data hold switch 98 that is coupled to the master controller 82 can be manually actuated to energize the latch means 72 to cause the data to be held in the LCD latch even after the latch means 72 receives the reset signal from the master controller 82.

Although the invention has been described and illustrated with a certain degree of particularity, it is understood that the present disclosure has been made only by way of example and that numerous changes in the details of construction and the combination or arrangement of parts may be made without departing from the spirit and scope of the invention as hereinafter claimed.

What is claimed is:

1. An electronic measuring device for determining the actual distance in feet and inches between a first point and a second point which are illustrated on a scaled drawing, said electronic measuring device comprising:

a master controller for controlling the electronic measuring device, said master controller including reset signal means capable of generating a reset signal;

calibrating means for adjustably selecting a scale of measurement;

indicia means coupled to said calibrating means for indicating the location of said first and second points on the scaled drawing;

generating means coupled to said calibrating means for generating a first signal corresponding to the actual measurement of the distance between the first and second points which are illustrated on the scaled drawing and as located on the drawing by the indicia means;

converting means coupled to said generating means for converting said first signal to a second signal;

first binary counter means coupled to said converting means for receiving said second signal and for generating a first binary count in response thereto;

second binary counter means for generating a second binary count;

first logic gate means operatively coupling said first binary counter means and said second binary counter means and said converting means and said master controller, whereby said second binary count is incremented when said first binary count reaches a predetermined count; and output means coupled to said first and second binary counter means for receiving said first and second binary counts and also for outputting said actual measurement which corresponds to said first and secondary binary counts;

said output means including latch means operatively coupling said master controller and said output means, and said first and second counter means for latching said first and second binary count until said latch means receives said reset signal from said reset signal means of said master controller.

2. The electronic measuring device as recited in claim 1 in which said converting means is a voltage to frequency converter and said first and second signals are voltage and frequency signals, respectively.

3. The electronic measuring device as recited in claim 1 in which said output means includes a liquid crystal display.

4. The electronic measuring device as recited in claim 1 in which said output means includes a liquid crystal display means and said latch means includes circuit means for generating an output signal suitable for use by said liquid crystal display means.

5. The electronic measuring device as recited in claim 1 in which said output means includes a liquid crystal display unit and said latch means includes circuit means for generating an output signal suitable for use by said liquid crystal display unit in which said electronic measuring device further includes display means coupled to said calibrating means and to said output means for displaying said preselected scale of measurement on said liquid crystal display unit.

6. The electronic measuring device as recited in claim 1 in which said generating means includes a potentiometer.

7. The electronic measuring device as recited in claim 1 including a third binary counter in which said calibrating means includes a normally closed switch coupling a third binary counter means to said energizing means whereby said preselected scale of measurement is changed by actuating said normally closed switch.

8. The electronic measuring device as recited in claim 1 in which said predetermined count is twelve.

9. The electronic measuring device as recited in claim 1 in which said first binary counter means and said second binary counter means include a plurality of base 10 binary counters for generating said first binary count and said second binary count, respectively.

10. The electronic measuring device as recited in claim 1 in which said first and second binary counts correspond to the inches and feet portions, respectively, of said actual measurement.

11. The electronic measuring device as recited in claim 1 in which said calibrating means includes a multiplexer.

12. An electronic measuring device for making an actual measurement in feet and inches of the distance between a first and second point which are shown on a drawing, said electronic measuring device comprising:

a housing;

a master controller located in said housing for controlling the electronic measuring device, said master controller including means for generating a reset signal;

energizing means for energizing the electronic measuring device;

switch means for connecting and disconnecting the master controller from said energizing means;

calibrating means for adjusting said master controller to a desired scale of measurement;

indicia means carried by said housing and coupled to said calibrating means and adjustable for locating said first and second points;

generating means coupled to said calibrating means for generating a voltage signal corresponding to the actual measurement of said distance between the first point and the second point shown the drawing, as determined by the indicia means and the calibrating means;

a voltage to frequency converter coupled to said generating means for converting said voltage signal to a frequency signal;

first binary counter means coupled to said converting means for receiving said frequency signal and for generating a first binary count in response thereto, said first binary count corresponding to the inches portion of said actual measurement;

second binary counter means for generating a second binary count; said second binary count corresponding to the feet portion of said binary count;

first logic gate means operatively coupling said first binary counter means and said second binary counter means and said converting means and said master controller so that said second binary count is incremented when said first binary count reaches twelve; and output means coupled to said first and second binary counter means for receiving said first and second binary counts and also for outputting the corresponding actual measurement in feet and inches;

said output means including latch means for latching said first and second binary count until said latch means receives said reset signal from said master controller, said latch means operatively coupling said master controller and said output means and said first and second counter means;

whereby when said indicia means is adjusted to indicate the, location of said first and second points on said drawing and said calibrating means is adjusted to said preselected scale and said generating means generates said first signal corresponding to said actual measurement and said converting means then converts said first signal into said second signal, said first binary counter receives said second signal and generates said first binary count in response thereto and said logic gate means operatively couples said first binary counter and second binary counter so that said second binary counter increments said second binary count when said first binary count reaches twelve and said output means thereafter receives said first and second binary counts and outputs said actual measurement corresponding thereto in feet and inches.

13. The electronic measuring device as recited in claim 12 in which said output means comprises a liquid crystal display.

14. The electronic measuring device as recited in claim 12 in which said output means includes a liquid crystal display unit and in which the latch means includes circuit means for generating an output signal suitable for use by said liquid crystal display unit.

15. The electronic measuring device as recited in claim 12 in which said output means includes a liquid crystal display unit and in which said electronic measuring device further includes a display means coupled to said calibrating means and said output means for displaying said scale of measurement selected on said liquid crystal display unit.

16. The electronic measuring device as recited in claim 12 in which said generating means includes a potentiometer.

17. The electronic measuring device as recited in claim 12 which includes third binary counter means and in which said calibrating means includes a normally closed switch coupling the third binary counter means to said energizing means so that said scale of measurement can be adjusted by actuating said normally closed switch.

18. The electronic measuring device as recited in claim 12 in which said master controller includes a second logic gate means which operatively couples said energizing means and said latch means to enable said latch means to receive said reset signal.

19. The electronic measuring device as recited in claim 12 in which said first binary counter means and said second binary counter means includes a plurality of base 10 binary counters operatively coupled to generate said first binary count and said second binary count, respectively.

20. The electronic measuring device as recited in claim 12 in which said calibrating means includes a multiplexer.

21. A method for obtaining an actual measurement in feet and inches of the distance between a first and second point which are illustrated on a scale drawing, said method comprising the steps of:
(a) locating the first and second points;
(b) generating a voltage signal corresponding to the actual measurement of the distance between said first and second points;
(c) converting said voltage signal generated in step (b) to a frequency signal;
(d) generating a first binary count in response to said frequency signal;
(e) incrementing a second binary count when said first binary count reaches a predetermined count; and
(f) outputting said actual measurement in feet and inches which corresponds to said first and second binary counts.

22. The method as recited in claim 21 in which said step (e) further includes the step of:
(e)(1) selecting said predetermined count to be twelve.

23. The method as recited in claim 21 in which said first binary count of step (d) is generated by a first binary counter means for generating the first binary count which corresponds to inches.

24. The method as recited in claim 21 in which said second binary count of step (e) is generated by a second binary counter means for generating the second binary count which corresponds to feet.

25. The method as recited in claim 21 in which said step (c) is effected by a voltage to frequency converter.

26. The method as recited in claim 21 in which said step (b) further includes the step of:
(b)(1) selecting a scale of measurement.

27. The method as recited in claim 21 in which said step (f) further includes the step of:
(f)(1) displaying said first and second binary counts with a liquid crystal display.

28. In an electronic measuring device having a housing; said housing including storage means for storing a source of potential for energizing said electronic measuring device; a method for making an actual measurement in feet and inches. of the distance between first and second points which appear on a drawing, comprising the steps of:
(a) providing a calibrating means;
(b) providing indicia means having first and second indicators;
(c) selecting a scale of measurement with said calibrating means for calibrating the electronic measuring device to a preselected scale of measurement,
(d) locating the first and second points with said indicia means with the first and second indicators, respectively, for indicating the location of said first and second points
(e) providing a potentiometer;
(f) generating a voltage signal with said potentiometer corresponding to an actual measurement in feet and inches of the distance between said first and second points;
(g) converting said voltage signal to a frequency signal;
(h) generating a first binary count corresponding to the inches of said actual measurement in response to said frequency, signal;
(i) incrementing a second binary count when said first binary count reaches twelve, said second binary count corresponding to the feet of said actual measurement; and
(j) outputting said actual measurement in feet and inches which corresponds to said first and second binary counts.

29. The method as recited in claim 28 in which said step (j) is effected by using a liquid crystal display and in which said step (j) further includes the step of:
(j)(1) latching said first and second binary counts with a binary latch for a predetermined period so as to enable said liquid crystal display to display said actual measurement for said predetermined period.

30. The method as recited in claim 28 in which said step (g) is effected by a voltage to frequency converter.

31. The method as recited in claim 28 in which said step (c) further includes the step of:
(c)(1) providing a third binary counter means operatively coupled to a multiplexer and a switch so that said scale can be selected by actuating said switch.

* * * * *